United States Patent [19]

Dewhurst et al.

[11] Patent Number: 5,308,880
[45] Date of Patent: May 3, 1994

[54] TIN CATALYSTS FOR USE IN RIM POLYOL BLENDS CONTAINING ACIDIC INTERNAL MOLD RELEASE AGENTS AND DIETHYLTOLUENEDIAMINE CHAIN EXTENDER

[75] Inventors: John E. Dewhurst, Macungie; James D. Nichols, Fogelsville; Ann C. L. Savoca, Bernville, all of Pa.

[73] Assignee: Air Products and Chemicals, Inc., Allentown, Pa.

[21] Appl. No.: 64,568

[22] Filed: May 20, 1993

[51] Int. Cl.$^5$ .................................... C08G 18/14
[52] U.S. Cl. .................................... 521/110; 521/111; 521/112; 524/722; 524/730; 524/731; 524/784; 528/53; 528/58; 252/182.24; 252/182.25; 252/182.26; 252/182.27
[58] Field of Search .................... 521/110, 111, 112; 524/722, 730, 731, 784; 528/53, 58; 252/182.24, 182.25, 182.26, 182.27

[56] References Cited

U.S. PATENT DOCUMENTS

| | | | |
|---|---|---|---|
| 3,726,952 | 4/1973 | Boden et al. | 264/48 |
| 3,993,606 | 11/1976 | Bonin et al. | 260/25 AH |
| 4,076,695 | 2/1978 | Keil | 260/77.5 |
| 4,098,731 | 7/1978 | Bonin et al. | 521/51 |
| 4,130,698 | 12/1978 | Sparrow et al. | 521/130 |
| 4,220,727 | 9/1980 | Godlewski | 521/110 |
| 4,379,100 | 4/1983 | Salisbury et al. | 264/39 |
| 4,396,729 | 8/1983 | Dominquez et al. | 521/51 |
| 4,420,570 | 12/1983 | Dominquez et al. | 521/112 |
| 4,472,341 | 9/1984 | Alberino et al. | 264/300 |
| 4,477,366 | 10/1984 | Robertson | 252/182 |
| 4,487,912 | 12/1984 | Zimmermann et al. | 528/52 |
| 4,585,803 | 4/1986 | Nelson et al. | 521/105 |
| 4,742,090 | 5/1988 | Hunter et al. | 521/124 |
| 4,764,540 | 8/1988 | Dewhurst et al. | 521/110 |
| 4,789,688 | 12/1988 | Dewhurst et al. | 521/110 |

FOREIGN PATENT DOCUMENTS

2262727  2/1990  Japan .
2262728  2/1990  Japan .

*Primary Examiner*—Maurice J. Welsh
*Attorney, Agent, or Firm*—Michael Leach; James C. Simmons; William F. Marsh

[57] ABSTRACT

An active hydrogen-containing B-side composition for reaction with a polyisocyanate-containing A-side composition to make a polyurethane, polyurethaneurea and/or polyurea elastomer by reaction injection molding, which B-side composition comprises an acidic mold release composition, diethyltoluenediamine chain extender and, as a catalyst, a diorganotin dicarboxylate in which the carboxylate contains at least one alpha halogen atom.

17 Claims, No Drawings

TIN CATALYSTS FOR USE IN RIM POLYOL BLENDS CONTAINING ACIDIC INTERNAL MOLD RELEASE AGENTS AND DIETHYLTOLUENEDIAMINE CHAIN EXTENDER

FIELD OF THE INVENTION

The present invention relates to catalysts for use in reaction injection molding compositions containing internal mold release agents.

BACKGROUND OF THE INVENTION

Reaction injection molding (RIM) is a versatile process by which elastomeric and thermoset parts can be fabricated. The RIM process involves high pressure impingement mixing of a polyisocyanate stream (A-side) and an active-hydrogen containing isocyanate-reactive stream (B-side) followed by immediate injection into the closed mold. The primary appeal of this process lies in its inherently high productivity. One factor which limits productivity, however, is the necessity to spray the molds with external mold release prior to each injection. This is a time-consuming task and often has a negative environmental impact. This difficulty can be overcome by the incorporation of an internal release agent into the formulation via one of the two streams to significantly increase the number of molding cycles which can be accomplished between mold release sprayings.

The use of metallic soaps as release agents has been known for a long time. Zinc stearate, in particular, is known to be soluble in aliphatic amines, such as the polyether polyamines and ethylenediamine-initiated polyols. This is the basis for its use as an internal mold release (IMR) agent in RIM. If zinc stearate is simply dispersed as a fine powder in polyol blends, it does not dissolve and does not act as a release agent. Various patents teach that zinc soaps can be compatibilized or dissolved in polyol blends with amines, enamines, ketimines or salts of amidines or guanidines, and that excellent releasability of the subsequent RIM parts will result.

While the IMR approach is commercially applied, there remains significant shortcomings to the currently available IMR systems. The amine-solublized metallic soaps, which are most commonly used in this application, have been implicated in reactivity and/or physical property deficiencies for the RIM elastomers in which they are used. Furthermore, the high melting points and limited solubilities of the metallic soaps make them prone to precipitation in the RIM processing equipment, necessitating replacement of the piping regularly.

Another class of IMR agents which has been reported includes fatty acidic materials. WO 84/03288 discloses the optional use of fatty acids in addition to metallic soaps plus amines. U.S. Pat. No.4,220,727 discloses the use of fatty acids plus their alkali metal salts. U.S. Pat. No. 4,130,698 discloses the use of fatty acids plus their esters. Salts of amines with fatty acids are taught in U.S. Pat. Nos. 3,726,952; 3,993,606 and 4,098,731. U.S. Pat. No. 3,726,952 discloses amines with fatty acids in which the amines include primary amines or amines which contain ester or amide groups. In U.S. Pat. No. 3,993,606 the amines include primary, secondary or tertiary amine-bearing polysiloxanes. In U.S. Pat. No. 4,098,731 the amines include tertiary amines with a tertiary amine nitrogen to carbon ratio between 1:3 and 1:12 and having no ester or amide groups present. The effect of acids on the NCO—OH reaction is to retard the rate sufficiently to cause green strength problems. Therefore these approaches cannot be used in conventional RIM systems using traditional tin catalysts.

The search for IMR agents which are liquids without the possibility of solidifying led to the development of special silicone fluids for this application. U.S. Pat. No.4,076,695 discloses certain carboxy-functional silicone fluids as IMR agents for RIM, including Dow Corning's commercial carboxy-functional silicone fluid Q2-7119, which has the following general formula:

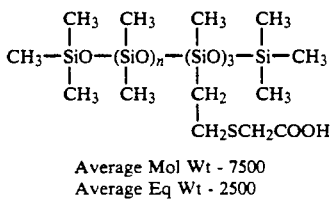

Average Mol Wt - 7500
Average Eq Wt - 2500

In general, acids have a deleterious effect on the green strength of aryldiamine-extended polyurethaneurea RIM systems due to a general deactivation of the tin catalyst. Thus, higher than normal levels of tin catalysts are needed when acids are present. Due to the sulfur atom, alpha to the carbonyl group, Q2-7119 is a much stronger acid than a typical fatty acid, such as lauric acid. Therefore, when T-12 (dibutyltin dilaurate) and Q2-7119 are in the same polyol blend, the equilibrium reaction involving the two components leads to a gelled silicone salt. This gelation results from a crosslinking reaction between the trifunctional silicone and the difunctional tin salt. The result is that the system exhibits extremely poor green strength which cannot be corrected by the addition of more tin catalyst.

Attempts to dissolve this problem include the following:

U.S. Pat. No. 4,379,100 discloses the use of a 3-stream approach to RIM molding where the Q2-7119 is delivered dispersed in polyol containing no tin catalyst. The other two streams are the normal A and B sides of RIM technology. The A side is isocyanate and the B side is a blend of polyol, diamine chain extender, surfactants and tin and amine catalysts.

U.S. Pat. No. 4,420,570 discloses that the tin catalyst can be placed in the A side. Gelation is avoided, but high levels of catalysts are still needed for adequate green strength. Furthemore, placing the tin catalyst in the isocyanate increases the moisture sensitivity and susceptibility to side reactions, such as allophonate formation, leading to gelation of the isocyanate.

U.S. Pat. No. 4,396,729 discloses replacing the polyether polyol and the tin catalyst with polyether polyamines which require no tin catalyst. The result is polyurea RIM, and Q2-7119 can be used with no chemical modification or 3-stream approach.

U.S. Pat. No. 4,472,341 discloses that the acid groups on Q2-7119 can be converted to amides by reaction with amines or to esters by reaction with alcohols or epoxides yielding nonacidic IMR silicones. These materials have been shown to cause paintability problems. In addition, they have been seen to interfere with polyol nucleation so that low part densities cannot be achieved. In extreme cases, large voids are found in the parts due to coalescence of bubbles.

U.S. Pat. No. 4,477,366 discloses that Q2-7119 can be dispersed on the isocyanate side by using a nonisocyanate-reactive silicone as a dispersing and inhibiting agent.

U.S. Pat. No. 4,487,912 discloses the use of the reaction products of fatty cyclic anhydrides with primary or secondary amines, including distearylamine as IMR agents.

U.S. Pat. No. 4,585,803 discloses that salts of Q2-7119 can be made with Group IA, IB, IIA, IIB, aluminum, chromium, molybdenum, iron, cobalt, nickel, tin, lead, antimony or bismuth. These salts are then compatibilized in the B-side blend with certain tertiary amines. In practice, these salts are extremely viscous or gelatinous in nature and do not disperse well into the polyol.

U.S. Pat. Nos. 4,764,540 and 4,789,688 disclose that salts of Q2-7119 can be made with amidines and guanidines, such as tetramethylguanidine, to yield neutralized forms of the silicone which would not gel tin catalysts. Waxy amidines such as the imidazolines from stearic acid and ethylenediamine derivatives were cited as particularly efficacious for release.

U.S. application Ser. No. 07/992,360, filed 16 Dec. 1992 discloses as the internal mold release (IMR) additive a composition consisting essentially of the reaction product of a tertiary amine, such as triethylenediamine (TEDA), with an epoxide reacted in the presence of a carboxy-functional siloxane such as Q2-7119. Application testing of these ionic silicone IMRs proves that they are release agents which do not gel tin catalysts. Excellent green strength and release is achieved using these release agents with conventional tin catalysts in RIM systems which are based on t-butyl toluenediamine (TBTDA) however, these new derivatives of Q2-7119 do not give good green strength in diethyl toluenediamine (TETDA) based RIM elastomer formulations with conventional tin catalysts even though no gellation of tin catalyst is seen.

U.S. Pat. No. 4,742,090 describes the use of bismuth carboxylates as catalysts for polyurethaneureas made from the reaction of polyisocyanates with blends of aromatic diamines with polyols.

JP 2,262,727 teaches the use of these bismuth salts and RIM systems based on TBTDA and IMR packages consisting of salts of fatty acids with tertiary amines.

JP 2,262,728 teaches the use of the bismuth salts for RIM systems based on tri-isopropyl-metaphenylenediamine and IMR packages consisting of salts of fatty acids with tertiary amines.

SUMMARY OF THE INVENTION

The present invention is directed to a tin catalyst for making a polyurethane, polyurethaneurea or polyurea elastomer in which a reactive mixture is formed in a mold cavity and cured. The reactive mixture contains polyol, organic polyisocyanate, the tin catalyst, diethyltoluenediamine (DETDA) chain extender, and acidic internal mold release additive. The present invention provides as the tin catalyst a diorganotin dicarboxylate in which the carboxylate group contains at least one alpha-halogen. These tin catalysts provide excellent green strength in RIM systems based on DETDA when acidic IMR agents are used.

Another embodiment of the invention is a polyol-containing B-side composition for reaction with a polyisocyanate-containing A-side composition. The B-side composition consists essentially of a polyol, the tin catalyst, acidic IMR additive, DETDA chain extender and, optionally, silicone surfactant.

Yet another embodiment of the invention provides a composition for catalyzing the reaction between an isocyanate and a compound having a reactive hydrogen atom, e.g., catalyzing the OH/NCO reaction.

DETAILED DESCRIPTION OF THE INVENTION

The present invention is directed to (1) a tin catalyst for use in a reaction injection molding process which uses an isocyanate-reactive composition containing DETDA crosslinker and an acidic IMR agent, (2) an isocyanate-reactive composition containing the tin catalyst, and (3) the use of the tin catalyst in a reaction injection molding process.

The tin catalyst used in the invention may be represented by the following general formula:

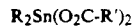

where
R is a $C_1$–$C_8$ alkyl, aryl or alkaryl group, and
R' is a $C_1$–$C_4$ alkyl group having at least one halogen atom which is alpha to the carboxyl functionality.

In the above formula it is preferred that R be butyl or octyl. The halogen may be fluorine, chlorine, bromine or iodine, but it is preferred that the halogen be chlorine. Although R' may be any $C_1$–$C_4$ alkyl group such as methyl, ethyl, propyl and butyl which contains 1 to 3 halogen atoms alpha to the carboxyl functionality, it is preferred that the alkyl group be monochloro-, dichloro- or trichloromethyl. Thus suitable carboxylic acids for making the catalysts would be acetic, propionic, butyric and pentanoic acids which contain 1 to 3 halogen atoms alpha to the carboxyl functionality with the preferred carboxylic acids being monochloro-, dichloro- and trichloroacetic acid.

A general procedure for preparing the tin catalysts would involve charging a mixture of the diorganotin oxide ($R_2SnO$), the appropriate carboxylic acid and a solvent such as toluene to a reaction vessel and heating the reaction mixture to reflux temperature until all the water of reaction has been removed by distillation. The organic solvent can then be evaporated to afford essentially quantitative yields of the diorganotin dicarboxylate catalyst.

The amount of the alpha-halogen containing tin catalyst used in the RIM composition is that amount which is sufficient to catalyze the urethane, urethaneurea, urea or isocyanurate reactions, i.e., an amount sufficient to catalyst the NCO—OH, NCO—NH or NCO—NCO reactions. Suitable amounts of the catalyst may range from 0.05 to 0.5 parts by weight (pbw) tin catalyst, preferably 0.1 to 0.2 pbw, per 100 pbw polyol in the B-side, or isocyanate-reactive, composition. The B-side composition comprises at least one high molecular weight active hydrogen containing compound such as a polyol, DETDA chain extender, optionally but preferably, an amine urethane catalyst and, optionally, silicone surfactant. The reaction mixture is preferably processed at an isocyanate index of from 70 to 130.

The tin catalysts according to the invention may be used in combination with tertiary amine urethane catalysts well known in the urethane art.

The catalyst compositions are suitable for use with either flexible or rigid, optionally cellular, polyurethane or polyurethane/urea elastomers in which DETDA is used as the diamine crosslinking agent. The molded articles may possess various combinations of these properties such as rigid, non-cellular elastomers or flexible, cellular products for use, for example, as shoe soles.

Exemplary of acidic internal mold release agents that may be used in the RIM compositions are those that are taught in the patent documents cited in the above BACKGROUND OF THE INVENTION, in particular, those acidic internal mold release agents that contain any of the following: the carboxy-functional siloxane taught in U.S. Pat. No. 4,076,695; the reaction product of a tertiary amine with an epoxide reacted in the presence of a carboxy-functional siloxane; and a fatty acid-containing material. The tin catalysts of the invention work especially well in DETDA-containing RIM compositions incorporating salts of fatty acids with tertiary amines in which the tertiary amine nitrogen to carbon ratios are greater than 1:12. Such tertiary amines would include dimethyllaurylamine, dimethylstearylamine and methyldicyclohexylamine.

Suitable polyisocyanates for use in the present invention are aliphatic, cycloaliphatic, araliphatic and aromatic polyisocyanates which are well known in the art. Specific examples include ethylene diisocyanate, 1,4-tetramethylene diisocyanate, 1,6-hexamethylene diisocyanate, cyclohexane-1,3- and 1,4-diisocyanate and isophorone diisocyanate. Typical aromatic polyisocyanates include phenylene diisocyanate, toluene diisocyanate and 4,4'-diphenylmethane diisocyanate. Especially suitable are the 2,4- and 2,6-toluene diisocyanates individually or together as their commercially available mixtures. Other especially suitable mixtures of diisocyanates are those known commercially as "crude MDI" also known as "PAPI", which contain about 60% of 4,4'-diphenylmethane diisocyanate along with other isomeric analogous higher polyisocyanates. Also suitable are prepolymers of these polyisocyanates comprising a partially prereacted mixture of polyisocyanate and polyether or polyester polyols disclosed hereinafter.

The polyether polyols useful in the invention include primary and secondary hydroxyl-terminated polyether polyols greater than 500 average molecular weight having from 2 to 6 functionality, preferably from 2 to 3, and a hydroxyl equivalent weight of from 250 to about 2500. Mixtures of polyether polyols may be used.

The polyether polyors are made from an appropriate initiator to which a lower alkylene oxide such as ethylene oxide, propylene oxide, butylene oxide or mixtures thereof is added resulting in hydroxyl-terminated polyols. When two or more oxides are used, they may be present as random mixtures or as blocks of one or the other polyether. Thus the polyalkylene ether polyols include the poly(alkylene oxide) polymers, such as poly(ethylene oxide) and poly(propylene oxide) polymers and copolymers with a terminal hydroxyl group derived from polyhydric compounds, including diols and triols; for example, among others, ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylolpropane and like low molecular weight polyols.

In the practice of this invention, a single high molecular weight polyether polyol may be used. Also, mixtures of high molecular weight polyether polyols such as mixtures of di- and tri-functional materials and/or different molecular weight or different chemical composition materials may be used.

Useful polyester polyols include those produced by reacting a carboxylic acid with an excess of a diol; for example, adipic acid with ethylene glycol or butane diol, or a lactone with an excess of a diol, such as caprolactone and propylene glycol.

Illustrative of suitable hydroxyl group-containing chain extenders are ethylene glycol, propylene glycol, butanediols, 1,6-hexanediol, diethylene glycol, triethylene glycol, tetraethylene glycol, dipropylene glycol, tripropylene glycol, glycerol and trimethylolpropane.

The aromatic diamine chain extenders used in this invention include 1-methyl-3,5-diethyl-2,4-diaminobenzene and 1-methyl-3,5-diethyl-2,6-diaminobenzene (both these materials are also called diethyltoluenediamine or DETDA);

Other conventional ingredients may be employed as needed, such as, for example, foam stabilizers, also known as silicone oils or surfactants, and reinforcing materials.

The compositions according to the present invention may be molded using conventional processing techniques and are especially suited for processing by the RIM process. In general, two separate streams are intimately mixed and subsequently injected into a suitable mold, although it is possible to use more than two streams. The first stream contains the polyisocyanate component, while the second stream contains the polyol component, tin catalyst, chain extender, the acidic internal mold release composition and any other additive which is to be included.

In the examples, the following ingredients were used:

Multranol 9139—A glycerin-initiated polyoxyalkylene polyether triol having a hydroxyl number of 28 from Mobay Corp.

Multranol M-4050—Polypropoxylated ethylenediamine with an equivalent weight of 90 from Mobay Corp.

DABCO ™ CL 485—Polypropoxylated ethylenediamine with an equivalent weight of 72.9 from Air Products and Chemicals, Inc.

tBTDA—An 80/20 mixture of 5-tert-butyl-2,4-toluenediamine and 5-tert-butyl-2,6-toluenediamine.

DETDA—An 80/20 mixture of 3,5-diethyl-2,4-toluenediamine and 3,5-diethyl-2,6-toluenediamine.

Armeen DM12D—Dimethyllaurylamine from Akzo.

Armeen DM18D—Dimethylstearylamine from Akzo.

POLYCAT® 12—Methyldicyclohexylamine from Air Products and Chemicals, Inc.

Hystrene 9022 —90% Behenic and Arachidic Acids from Witco Chemical Corp.

DABCO® DC 198—A commercial silicone surfactant from Air Products and Chemicals, Inc.

DABCO® Crystalline—Triethylenediamine from Air Products and Chemicals, Inc.

DABCO T-12—Dibutyltin dilaurate from Air Products and Chemicals, Inc.

DABCO T-125—Dibutyltin di(isooctylmaleate) from Air Products and Chemicals, Inc.

DABCO 33LV®—A 33% solution of triethylenediamine in a glycol carrier from Air Products and Chemicals, Inc.

POLYCAT DBU—Diazabicyclo[5.4.0]undec-7-ene from Air Products and Chemicals, Inc.

Mondur PF—4,4'-diphenylmethanediisocyanate which has been liquefied by reaction with a low molecular weight glycol to an NCO content of about 22.6% from Mobay Corp.

Q2-7119—Carboxy-functional silicone IMR agent from Dow Corning Corp.

In the following Examples and Tables all parts are pbw.

EXAMPLE 1—IMR AGENT 1

44.8 parts of DABCO Crystalline TEDA were dissolved in 500 parts of Q2-7119 carboxy functional siloxane with stirring at 80°C. To this was added 60 parts of Epodil 748 glycidyl ether of lauryl alcohol. As the reaction occurred, an exotherm to 100° C. was noted. The mixture was stirred for three hours at 80° C., after which time the reaction was judged to be over.

EXAMPLE 2—IMR AGENT 2

13.2 parts of DABCO Crystalline TEDA were dissolved in 148.9 parts of Q2-7119 carboxy functional siloxane with stirring at 80° C. To this was added 17.9 parts of Epodil 748 glycidyl ether of lauryl alcohol. As the reaction occurred an exotherm to 100° C. was noted. The mixture was stirred for three hours at 80° C., after which time the reaction was judged to be over.

EXAMPLE 3—IMR AGENT 3

A solution of 25 grams of stearic acid in 32.14 grams of Armeen DM12D dimethyllaurylamine was made by heating and stirring. Upon cooling it was found to solidify quickly. To this solution was added 42.86 grams of Multranol M-4050 polyol. This kept the solution liquid for one day at room temperature.

EXAMPLE 4—IMR AGENT 4

A solution of 25 grams of stearic acid, 32.14 grams of Polycat 12 catalyst and 42.86 grams of Multranol M-4050 polyol was made with heating and stirring.

EXAMPLE 5—IMR AGENT 5

A solution of 25 grams of Hystrene 9022 acid, 32.14 grams of Polycat 12 catalyst and 42.86 grams of Multranol M-4050 polyol was made with heating and stirring.

EXAMPLE 6—IMR AGENT 6

A solution of 105 grams of tall oil and 135 grams of Armeen DM18D dimethylstearylamine was made by stirring at room temperature. A slight exotherm of neutralization was noticed.

EXAMPLE 7—IMR AGENT 7

A solution of 105 grams of oleic acid and 135 grams of Polycat 12 catalyst was made with stirring.

EXAMPLE 8—Dibutyltin Bis(trifluoroacetate)

A mixture of dibutyltin oxide, 24.9g (0.10 mole) and toluene, 100 ml, was charged to a 500 ml reaction flask (fitted with a stirrer, thermocouple, addition funnel and reflux condenser with a Dean-Stark water trap). Trifluoroacetic acid, 22.8 g (0.20 mole) dissolved in 100 ml toluene was placed in the addition funnel and slowly added to the stirred dibutyltin oxide/toluene mixture at ambient temperture (a reaction exotherm of 100° C. was observed). When addition of the trifluoroacetic acid was completed the resultant solution was dehydrated via azeotropic distillation by heating at reflux for 1.0 hour (2 ml water collected). Stripping of the toluene (flash evaporator) yielded 43.5 g (95%) of the desired product, an amber colored solid, m.p. 43°-44° C. The chemical structure was confirmed by C13 NMR and IR spectroscopy; the IR spectrum show a single carbonyl band at 1666 cm−1 which is characteristic of the Sn-OCO-functional group.

EXAMPLE 9—Dibutyltin Bis(dichloroacetate)

Dibutyltin oxide (DBTO), 79.5 g (0.32 mole) and toluene, 200 ml, were charged to a 500 ml reaction flask (fitted with a stirrer, thermocouple and reflux condenser with a Dean-Stark water trap). Dichloroacetic acid, 64.5 g (0.50 mole), dissolved in 50 ml toluene was added all at once to the DBTO/toluene mixture and the resultant mixture heated at reflux for 2 hr during which time 5 ml water was collected. The reaction mixture was filtered to remove the excess DBTO. The toluene solution was filtered a second time after standing at ambient temperature for 3 hr to remove a small amount of crystalline precipitate. Stripping of the toluene (flash evaporator) yielded 100 g (82% yield) of the desired product, a white powder, m.p. 122°-124° C. The IR (single carbonyl band at 1634 cm−1) and NMR spectra were consistent with the expected structure for the titled compound.

EXAMPLE 10—Dibutyltin Bis(p-dodecylbenzenesulfonate)

Following the procedure of Example 8, dibutyltin oxide, 24.9 g (0.10 mole), 4-dodecylbenzenesulfonic acid, 65.2 g (0.20 mole) and 200 ml toluene were charged to the reactor (15° C. exotherm observed) and dehydrated via azeotropic distillation (3 ml water collected) by heating at reflux for 3 hours. After stripping off the toluene the crude product was extracted with acetone; removal of the acetone yielded a sticky solid which was then dried under vacuum at 60° C. for 24 hours. The resultant product was a grayish brown solid, m.p. 57°-60° C. The C13 NMR spectrum was consistent with the structure of the titled compound; the IR spectrum showed two bands at 1600.8 and 1573.5 cm−1 that are attributed to the SN-OSOO- functional group.

EXAMPLE 11—Dibutyltin Bis(monochloroacetate)

Dibutyltin oxide (DBTO), 50.8 g (0.32 mole) and toluene, 350 ml, were charged to a 500 ml reaction flask (fitted with a stirrer, thermocouple and reflux condenser with a Dean-Stark water trap). Monochloroacetic acid, 38.38 g (0.40 mole) was added all at once to the DBTO/toluene mixture and the resultant mixture heated at reflux for 1 hr during which time 1.35 ml water was collected. The reaction mixture was filtered to remove the excess DBTO. Stripping of the toluene (flash evaporator) yielded 85.26 g (82% yield) of the desired product, a slightly yellow powder.

All RIM parts were made on a Battenfeld SHK 14 Piston Metering RIM machine. Plaques weighing 128 grams (including the aftermixer and runner) were made using a stainless steel mold sprayed with ChemTread RCTW-2006 external mold release (EMR). One face of the plaque mold was treated with EMR prior to each shot while the other was treated prior only to the first shot. A system with no EMR agent gives 5 to 7 shots before severe sticking and delamination takes place. A system with at least fifteen releases before such sticking was judged to be releasing well.

EXAMPLES 12 AND 13

The two RIM systems containing acidic IMR agent 1 shown in Table 1 were run according to the procedure outlined above, with the release results shown. The system based on DETDA chain extender gave very poor green strength using T-12 catalyst.

TABLE 1

| Example | 12 | 13 |
| --- | --- | --- |
| Multranol 9139 | 78 | 78 |
| tBTDA | 18 | |
| DETDA | | 18 |
| DC 198 | 0.8 | 0.8 |
| DABCO 33LV | 0.1 | 0.1 |
| T-12 | 0.1 | 0.1 |
| IMR Agent 1 | 3 | 3 |
| Mondur PF | 47 | 47 |
| Green strength | excellent | very poor |
| Release | excellent | couldn't be judged |

EXAMPLES 14 AND 15

The following RIM systems without IMR agent were run to demonstrate the useful activity of some of the catalysts of the present invention.

TABLE 2

| Example | 14 | 15 |
| --- | --- | --- |
| Multranol 9139 | 81.0 | 81.0 |
| DETA | 18.0 | 18.0 |
| DC 198 | 0.8 | 0.8 |
| DABCO 33LV | 0.1 | 0.1 |
| Ex. 8 cat | 0.1 | |
| Ex. 10 cat | | 0.1 |
| Mondur PF | 47.0 | 47.0 |
| Green strength | excellent | |
| Flex Modulus | 32,180 | 31,980 |
| Elongation | 261% | 248% |
| Die C Tear | 550 | 534 |
| 6", 250° F. Sag (15.2 cm, 121° C.) | 1.575 cm | 1.532 cm |
| 4", 325° F. Sag (10.2 cm, 163° C.) | 2.276 cm | 1.925 cm |

EXAMPLES 16 AND 17

The following RIM examples show the use of the tin catalysts in DETDA-based systems containing an acidic IMR agent. Surprisingly, Table 3 shows the tin compound from the highly acidic p-dodecylbenzene sulfonic acid (Example 10 catalyst) did not perform as well as the halocarboxylate compound (Example 8 catalyst).

TABLE 3

| Example | 16 | 17 |
| --- | --- | --- |
| Multranol 9139 | 77.5 | 77.5 |
| DETDA | 16.5 | 16.5 |
| DABCO CL 485 | 3.0 | 3.0 |
| IMR Agent 2 | 2.0 | 2.0 |
| DC198 | 0.8 | 0.8 |
| DABCO 33LV | 0.1 | 0.1 |
| Ex. 8 cat | 0.1 | |
| Ex. 10 cat | | 0.2 |
| Mondur PF | 51.7 | 51.7 |
| Green strength | Excellent | Poor |

EXAMPLES 18 TO 22

These examples compare the traditional T-12, T-125 and dibutyltin dichloride catalysts with catalysts of the present invention in RIM systems containing DETDA and IMR agent 3. As can be seen in Table 4 dibutyltin dichloride did not behave like the halocarboxylate compounds (Examples 8 and 9).

TABLE 4

| Example | 18 | 19 | 20 | 21 | 22 |
| --- | --- | --- | --- | --- | --- |
| Multranol 9139 | 75.5 | 75.5 | 75.5 | 75.5 | 75.5 |
| DETDA | 16.5 | 16.5 | 16.5 | 16.5 | 16.5 |
| IMR Agent 3 | 7.0 | 7.0 | 7.0 | 7.0 | 7.0 |
| DC 198 | 0.7 | 0.7 | 0.7 | 0.7 | 0.7 |
| Polycat DBU | 0.1 | 0.1 | 0.1 | 0.1 | 0.1 |
| T-12 | 0.2 | | | | |
| T-125 | | 0.2 | | | |
| Dibutyltin dichloride | | | 0.2 | | |
| Example 8 cat | | | | 0.2 | |
| Example 9 cat | | | | | 0.2 |
| Mondur PF | 50.0 | 50.0 | 50.0 | 50.0 | 50.0 |
| Green Strength | poor | | | excellent | excellent |
| Release | couldn't be judged | | | excellent | excellent |

EXAMPLES 23 TO 26

The Examples show the utility of the monochloroacetate and trifluoroacetate compounds in RIM systems containing DETDA and an acidic IMR agent.

TABLE 5

| Example | 23 | 24 | 25 | 26 |
| --- | --- | --- | --- | --- |
| Multranol 9139 | 75.5 | 75.5 | 75.5 | 75.5 |
| DETDA | 16.5 | 16.5 | 16.5 | 16.5 |
| IMR Agent 4 | 7.0 | | | |
| IMR Agent 7 | | 7.0 | | |
| IMR Agent 5 | | | 7.0 | |
| IMR Agent 6 | | | | 7.0 |
| DC 198 | 0.7 | 0.7 | 0.7 | 0.7 |
| Polycat DBU | 0.1 | 0.1 | 0.1 | 0.1 |
| Ferric Chloride | 0.2 | | | |
| Example 8 cat | | | 0.2 | 0.2 |
| Example 11 cat | | 0.2 | | |
| Mondur PF | 50.0 | 50.0 | 50.0 | 50.0 |
| Green Strength | poor | | excellent | |
| Release | ** | | excellent | |

**Could not be judged.

STATEMENT OF INDUSTRIAL APPLICATION

A tin catalyst composition is provided for making reaction injection molded polyurethane, polyurethane, polyurethaneurea, and polyurea articles from RIM compositions containing DETDA chain extenders and acidic IMR agents.

We claim:

1. In an active hydrogen-containing B-side composition for reaction with a polyisocyanate-containing A-side composition to make a polyurethane, polyurethaneurea and/or polyurea elastomer by reaction injection molding, which B-side composition also contains an acidic internal mold release composition and diethyltoluenediamine chain extender, the improvement which comprises a diorganotin dicarboxylate in which the carboxylate group contains at least one alpha-halogen atom.

2. The B-side composition of claim 1 in which the halogen is fluorine, chlorine, bromine or iodine.

3. The B-side composition of claim 1 in which the halogen is chlorine.

4. The B-side composition of claim 1 in which the carboxylate group contains 1-3 alpha-halogen atoms.

5. The B-side composition of claim 1 in which the carboxylate group is monochloroacetate, dichloroacetate or trichloroacetate.

6. In a polyol-containing B-side composition for reaction with a polyisocyanate-containing A-side composition to make a polyurethane, polyurethaneurea and/or polyurea elastomer by reaction injection molding, which B-side composition also contains an acidic internal mold release composition and diethyltoluenediamine chain extender, the improvement which comprises, per 100 pbw polyol, 0.05 to 0.5 pbw diorganotin dicarboxylate of the following general formula:

$$R_2Sn(O_2C-R')_2$$

where
R is a $C_1$-$C_8$ alkyl, aryl or alkaryl group, and
R' is a $C_1$-$C_4$ alkyl group having at least one halogen atom which is alpha to the carboxyl functionality.

7. The B-side composition of claim 6 in which the halogen is fluorine, chlorine, bromine or iodine.

8. The B-side composition of claim 6 in which the halogen is chlorine.

9. The B-side composition of claim 6 in which the carboxylate group contains 1-3 alpha-halogen atoms.

10. The B-side composition of claim 6 in which R' is monochloromethyl, dichloromethyl or trichloromethyl.

11. The B-side composition of claim 6 in which R is butyl or octyl.

12. In a polyol-containing B-side composition for reaction with a polyisocyanate-containing A-side composition to make a polyurethane, polyurethaneurea and/or polyurea elastomer by reaction injection molding, which B-side composition also contains an acidic internal mold release composition which is a carboxy-functional siloxane, the reaction product of a tertiary amine reacted with an epoxide in the presence of a carboxy-functional siloxane, or a fatty acid-containing material, and diethyltoluenediamine chain extender, the improvement which comprises, per 100 pbw polyol, 0.05 to 0.5 pbw diorganotin dicarboxylate of the following general formula:

$$R_2Sn(O_2C-R')_2$$

where
R is a $C_1$-$C_8$ alkyl group, and
R' is a $C_1$-$C_4$ alkyl group having at least one halogen atom which is alpha to the carboxyl functionality.

13. The B-side composition of claim 12 in which the halogen is fluorine or chlorine.

14. The B-side composition of claim 12 in which the halogen is chlorine.

15. The B-side composition of claim 13 in which the carboxylate group contains 1-3 alpha-halogen atoms.

16. The B-side composition of claim 12 in which R' is monochloromethyl, dichloromethyl or trichloromethyl.

17. The B-side composition of claim 12 in which R is butyl or octyl.

* * * * *